Nov. 18, 1952          S. C. FOURNET          2,618,063
APPARATUS FOR ASSEMBLING ARTIFICIAL TEETH
Filed May 29, 1950                             2 SHEETS—SHEET 1
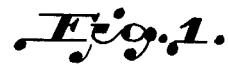
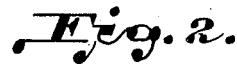
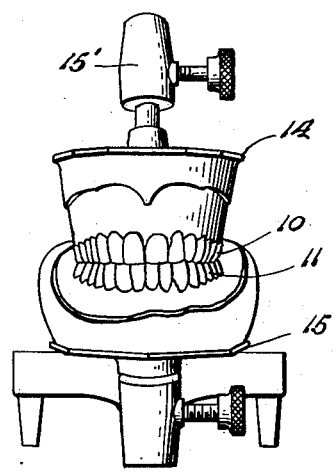
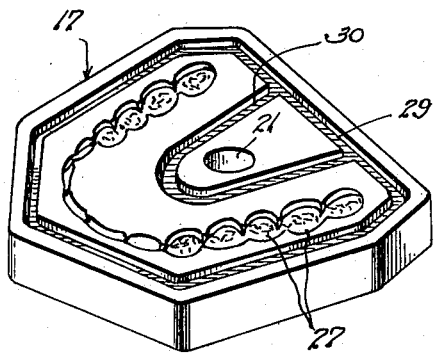
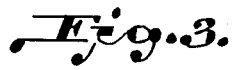
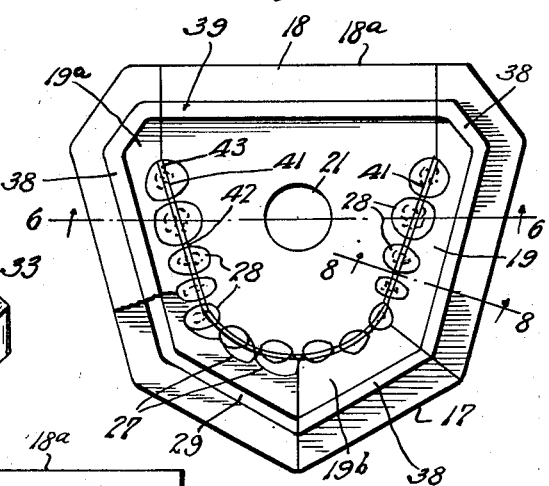
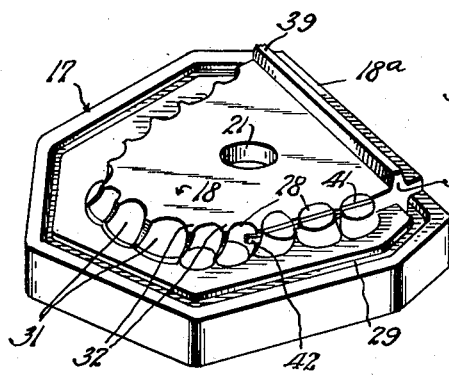
INVENTOR.
Sidney C. Fournet
BY
Eugene E. Stevens
ATTORNEY.

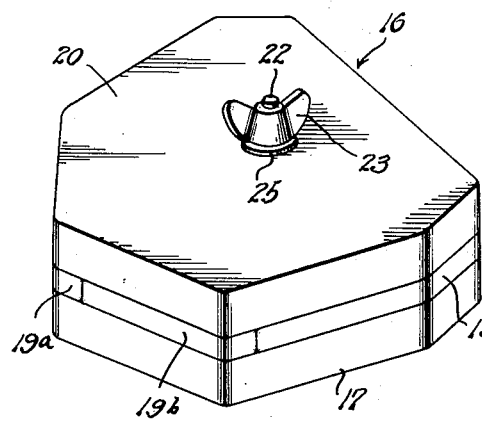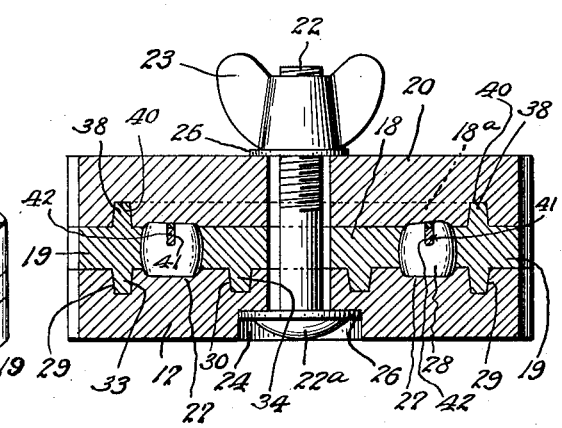

Patented Nov. 18, 1952

2,618,063

UNITED STATES PATENT OFFICE 2,618,063

APPARATUS FOR ASSEMBLING ARTIFICIAL TEETH

Sidney C. Fournet, New Orleans, La.

Application May 29, 1950, Serial No. 164,938

10 Claims. (Cl. 32—11)

My invention relates to improvements in prosthetic dentistry, with particular reference to complete dental restorations, although in its broader aspects not limited thereto.

Briefly and generally stated, the invention has for its primary aim to make possible the expeditious and inexpensive quantity production of anatomically articulated upper and lower sets of artificial teeth in all the different sizes or varieties which the dentist may require for his different patients.

Sets of individual false teeth, usually secured to a card or a length of tape, are made available to dentists in different shapes and sizes. Then the dentist, after selecting a set which is suitable for an individual patient, must, in accordance with the standard practice, make an anatomical set-up of the teeth (uppers and lowers) on his articulator. This means the individual setting of each tooth in wax reproductions of the alveolar ridges of the patient are secured to the articulator. Even when the operator is an expert, much trial and error procedure (readjustment of teeth here and there) is involved before manipulation of the articulator indicates that perfect anatomical articulation has been achieved.

The production, on an articulator, of an anatomically articulated set of uppers and lowers in the wax ridge-carried state, as above mentioned, is a task requiring from two to four hours for even an expert in the field, and, of course, much longer for the less adept. Then too, some dentists simply do not have the time or patience for this sort of work and turn it over to a laboratory at considerable expense. It is this articulation-achieving phase of dental restoration work which makes sets of artificial teeth so much more expensive than would otherwise be warranted, considering the cost of material and time actually occupied in fitting the plates to the mouth of the patient.

Having the foregoing in mind, I provide for the expeditious and quantity production of anatomically articulated sets of upper and lower teeth, including partial and complete sets, by first, having perfectly articulated master sets (uppers and lowers) produced by an expert on an articulator in the usual way. Then, from each of the master sets so produced two sectional assembly molds are made, one for the upper set and the other for the lower set. Such sectional assembly molds provide seating pockets for the reception of teeth corresponding to those employed in production of the master set. Thus, each assembly mold assures of the exact duplication of the setting of the teeth of the master set, including, of course, the precise arrangement of the occlusional surfaces of the master set of teeth.

The invention also contemplates the permanent connection of the teeth in the assembly mold prior to removal of same so that the relationship of the occlusional surfaces of corresponding uppers and lowers will not be disturbed, the means employed for connecting the teeth being such as to enable the set to be spread or contracted to conform to the particular alveolar ridges in which they are to be mounted.

Various other objects and advantages of the invention will be mentioned later on herein or will be obvious to those skilled in the art from a reading of the following descriptive matter in connection with the accompanying drawings.

In accordance with the requirements of the patent statutes, I have illustrated in the drawings the now preferred form of my invention. However, it is to be understood that various changes and modifications may be made therein within the scope of the subject matter claimed hereinafter.

In the drawings, wherein the same reference characters have been used to designate the same parts throughout the several view—

Fig. 1 illustrates a master set of teeth, uppers and lowers, which have been set by an expert, same being shown mounted on a dental articulator;

Fig. 2 is a perspective view of the base element of my novel assembly mold;

Fig. 3 is a perspective view of the base element of the assembly mold and illustrating the lingual mold section in place thereon, the latter providing portions of the tooth-receiving seats;

Fig. 4 is a plan view, partly broken away, illustrating the lingual mold section in place on the base and, likewise, the labial and buccal mold sections, the teeth being illustrated in place in the seats and connected by a flat wire;

Fig. 5 is a perspective view of the assembled mold for either an upper or lower set of teeth;

Fig. 6 is a cross-sectional view taken on the line 6—6 of Fig. 4;

Fig. 7 is a bottom plan view of the lingual mold section;

Fig. 8 is an enlarged sectional detail taken on the plane of line 8—8 of Fig. 4, but with the teeth deleted;

Fig. 9 is a plan view of a finished set of teeth (uppers or lowers) removed from the mold; and Fig. 10 is a perspective view, partly broken and partly in section, of one of the labial mold sections.

Referring to the drawings by reference characters, and referring to Fig. 1, the numerals 10 and 11 designate, respectively, the upper and lower sets of teeth which have been arranged in the usual way by an expert employing the articulator shown. These sets 10 and 11 are referred to hereinafter as "master sets." The articulator shown in Fig. 1 forms no part of the present invention. It involves the usual base 15 and shiftable upper section 14 with the control projection 15 extending thereabove.

The master sets of teeth 10, 11, after they have been found to be in perfect anatomical articulation, are permanently mounted in the usual way and a sectional mold 16 is produced from each of the sets 10 and 11 so that teeth corresponding to those employed in the master sets 10 and 11 can be assembled in such molds in the precise relationship of the master sets. Since molds 16 are essential duplicates, a description of one will suffice for both.

Turning now to the novel assembly mold, Fig. 2 illustrates the base of such mold which is indicated by reference character 17, while Fig. 3 indicates the lingual section 18 of the mold in place on the base 17. Then turning to Fig. 4, it will be seen that the labial and buccal side portions 19, 19a, 19b have been positioned in place to complete the tooth-receiving sockets which will be referred to later on.

And finally, the mold has the top section 20, as indicated in Figs. 5 and 6 which also illustrate the sections 17, 18, 20 as having a central hole extending therethrough for the reception of a clamp bolt 22 whose outer end receives the wing nut 23. The head 22a of the clamp bolt is preferably received in a surface recess 24 in the bottom of the base section 17 of the mold so that the latter can rest flatly on a supporting surface. Washers 25, 26 are interposed between the wing nut 23 and the head 22a of the bolt, as illustrated in Fig. 6.

At this point it is proper to mention that the mold sections 17, 18, 19, 19a, 19b, 20 will necessarily be initially produced using plaster of Paris or some initially plastic refractory material. Thereafter, however, the mold sections will be duplicated in known manner in metal for the sake of permanence.

Now as to the detail formation of the various mold parts, and referring first to the base section 17 of Fig. 2, it will be noted that its top surface has the impressions 27 exactly conforming to the biting or chewing ends of the set of teeth 10 or 11 of Fig. 1. These impressions 27 in the base section 17 are of a depth to reproduce, in addition to the chewing or biting (occlusal) surfaces of the teeth, a slight portion of the length of same inwardly of said surfaces. Numeral 28 indicates teeth corresponding to those from which the master set (say, 10) was produced.

As shown, the base 17 is of seven-sided form, but its shape is of course immaterial. Inwardly of the margin of the base the top surface of same has the endless groove 29, while communicating with such groove 29 at what might be termed the rear of said base as viewed in Fig. 2 is another groove of horseshoe form indicated at 30. These grooves 29, 30 serve to properly center the mold sections 18, 19, 19a, 19b, as will be presently explained.

Turning now to Figs. 3, 6 and 7, and referring particularly to Fig. 3, it will be noted that the lingual mold section 18 has its straight rear edge 18a lying flush with the rear edge of the base section 17 and that the sides and forward portion of said lingual section 18 are spaced inwardly of the endless groove 29 which is provided in the top surface of said base section 17. Inspection of Fig. 3 further indicates that the labial (lip) and buccal (side) portions of the lingual section 18 provide the inner or lingual portions 31 of the tooth seats which are provided by the mold. These seat portions 31 are separated by inward projections 32 which extend half-way between the teeth 28 at at least one point, preferably near the root ends of the teeth. The upper ends of the projections 32, as viewed in Fig. 8, are notched as indicated to clear the tooth-connecting wire 42 which will be referred to later on herein.

Accurate seating of the lingual mold section 18 on the base section 17 is obtained by providing the under surface of the lingual section 18 with a horseshoe-shaped protruding rib for reception in the groove 30 of the base, said rib being indicated by reference character 34; and the bottom surface of the lingual section 18 also has the straight rib 33 which is received in the rear portion of the groove 29 of said base 17. Thus accurate seating of the lingual mold section 18 on the base section 17 is assured.

The mold sections 19, 19a, 19b which complete the sockets or seats for the teeth 20a have bottom ribs 35 adapted to be received in the unoccupied portion of the base groove 29 and the outer edges of said sections provide the intermediate outer edge of the assembled mold, as indicated in Fig. 5.

Referring to Fig. 8, the buccal (or side) mold sections 19, and likewise the forward (labial) mold sections 19a, 19b, each have the partial tooth seats 36 which are separated by the inward separating projections 37 illustrated. These projections 37 meet at one point the corresponding seat portion-separating projections 32 of the lingual mold section 18 illustrated in Fig. 8. Also, the seat portion-separating projections 37 cooperate with the notches 32a in the lingual section projections 32 to accommodate the wire 42, previously mentioned and which will be dealt with in more detail later on herein.

Referring to Fig. 3, the rear edge of the lingual section 18 has an upstanding rib 39, while the top surfaces of the sections 19, 19a, 19b likewise have upstanding top surface ribs which join with one another when the parts are assembled, and such ribs 38, 39 provide the endless rib which is received in the bottom surface groove 40 of the top or root-compressing section 20 of the mold, as indicated in Fig. 6.

Now as to the matter of assembling of the teeth in the mold 16, the initial disposition of the teeth 28 in the mold is made after the lingual section 18 has been put in place as illustrated in Fig. 3. Thus the seat portions 31 of said lingual section 18 serve to cooperate with the occlusal end seat portions 27 to effect at least approximately accurate seating of the teeth 28.

The teeth 28, as indicated, have the preformed root grooves 41, and before application of the labial and buccal mold sections 19a, 19b, 19, a flat wire 42 is disposed in the root grooves 41 of the teeth 28, as indicated in Figs. 3 and 4. The wire 42 having been put in the grooves as indicated, the labial and buccal mold sections 19a, 19b, 19 are put into place and the passage of the seat portion-separating projections 37 of said sections 19a, 19b, 19 to meeting engagement with the corresponding projections 32 of the lingual section 19, serves to effect accurate seating of the teeth 28 in the thus completed tooth seats.

However, before permanently securing the wire 42 in the tooth grooves 41 it is well to put the top or root mold section 20 in place and clamp same rather tightly into engagement with the subjacent mold part assembly. This further assures of proper seating of the occlusal ends of the teeth in the base seat portions 27. Then the top or root section 20 of the mold can be removed and acrylic or other plastic disposed in the tooth grooves 41 upon the wire 42 therein. Following this the top or root section of the mold is reapplied and clamped in place. This clamping action of the top or root section of the mold 20 against the exposed root ends of the teeth 28 compresses the acrylic into the tooth grooves 41. Then after the acrylic has set and hardened, the top or root section 20 of the mold is removed and the other mold parts separated to admit of removal of the connected assembly of teeth 28 which is illustrated in Fig. 7.

An important feature of the invention is that with the labial and buccal sections 19a, 19b, 19 removed and out of the way, it is a simple matter to locate the wire 42 in the tooth grooves 41 and in the notches provided by the tooth recess receiving partitions 32, 37 (Fig. 8). The operation of putting the wire 42 in place as above described is apt to slightly disarrange at least some of the teeth 28 so that the occlusal ends are imperfectly seated in the base recesses 27. However, application of the buccal and labial sections 19, 19a, 19b and the passage of their projections 37 to engagement with the projections 32 of the lingual section 19 causes a gentle shifting of such teeth 28 to re-establish a perfect fit of the occlusal ends thereof in the base recesses 27. The mold 16 being sectional the finished connected set of teeth (see Fig. 9) can be readily removed, as will be obvious.

Referring to the finished set of teeth 28 of Fig. 9, which are connected by the flat wire 42, it will be noted that the rounded mesio-distal contacting portions of the teeth 28 admit of such outward or inward pivoting movement as will enable the assembled set to be spread inwardly or outwardly as indicated in dotted lines in Fig. 9 to conform to the particular alveolar ridge in which they are to be fixed, such action being permitted by the connecting wire 42. Inasmuch as both sets of teeth 28 (uppers and lowers) will be spread or opened exactly the same amount to fit the alveolar ridges in which they are to be set (said ridges obviously being of identical spread) the occlusional relationship of the teeth 28 in the upper and lower sets will not be disturbed. The connecting wire 42 being flat will resist other than lateral movement, thus maintaining the initially achieved perfect anatomical articulation of the sets when finished and installed in plates.

Although the invention's primary field of utility is reproduction of complete dentures, yet it nevertheless is adapted to duplicate partial dentures. So the expression "set" or "set of teeth" is to be interpreted broadly.

It is believed from the foregoing that the details of my invention and its advantages will be readily understood and appreciated.

I claim:

1. Means for duplicating a master set of upper and lower anatomically articulated teeth comprising a separate sectional assembly mold of hard material for each of said upper and lower set, said mold having a series of tooth-receiving sockets formed by the upper or lower master set of teeth, as the case may be; said mold comprising a base section having its top surface provided with tooth seat-providing recesses conforming to the biting or occlusal ends of the master set of teeth, a second mold section positionable upon said base section and corresponding to the lingual area of the mouth, said lingual section providing edge recesses shaped to conform to the lingual portions of teeth corresponding to those of the master set, outwardly projecting partition elements separating said seat portions and adapted to project approximately midway between seated teeth, separate labial and buccal mold sections disposable on said base outwardly of said lingual section, said labial and buccal sections providing seating recesses in opposition to the seating recesses provided by said lingual section, projections separating the respective seating recesses of the labial and buccal sections, said projections adapted to contact between teeth with the seat-separating projections of said lingual portion at at least one point inwardly of the root ends of the teeth, the outer end of at least one of said contacting projections being cut away to provide a tooth connector accommodating notch, a closure-providing mold section disposable over the root ends of the teeth and upon said lingual, labial and buccal sections for compressing sealing material in the tooth grooves, the contiguous surfaces of said mold sections having interfitting position-defining means whereby to prevent relative sideward shifting of the assembled sections, and means for compressing said sections together.

2. Means for duplicating a master set of upper and lower anatomically articulated teeth comprising a separate sectional assembly mold of hard material for each of said upper and lower set, said mold having a series of tooth-receiving sockets formed by the upper or lower master set of teeth, as the case may be; said mold comprising a base section having its top surface provided with tooth seat-providing recesses conforming to the biting or occlusal ends of the master set of teeth, a second mold section positionable upon said base section and corresponding to the lingual area of the mouth, said lingual section providing edge recesses shaped to conform to the lingual portions of teeth corresponding to those of the master set, outwardly projecting partition elements separating said edge recesses and adapted to project approximately midway between seated teeth, separate labial and buccal mold sections disposable on said base outwardly of said lingual section, said labial and buccal sections providing seating recesses in opposition to the seating recesses provided by said lingual section, projections separating the respective seating recesses of the labial and buccal sections, said projections adapted to contact between teeth with the seat-separating projections of said lingual portion at at least one point inwardly of the root ends of the teeth, a tooth connector compressing closure-providing mold section disposable over the root ends of the teeth and upon said lingual, labial and buccal sections, and the contiguous surfaces of said mold sections having interfitting position-defining means whereby to prevent relative sideward shifting of the assembled sections.

3. Apparatus for use in assembling and connecting teeth to exactly duplicate occlusially and otherwise the relative positioning of the teeth in an upper or lower master set and comprising a sectional assembly mold of hard material having tooth-receiving and embracing sockets formed by said master set, said sockets being adapted to receive individual unconnected teeth corresponding to those of the related master set, said mold comprising a base section having surface recesses corresponding to the occlusal or biting ends of the master set teeth, a raised portion on said base and providing lingual tooth-receiving recesses as continuations of the lingual sides of said base recesses, said recesses forming part of said tooth-receiving sockets and cooperating to sustain in position teeth as they are placed therein, and separable labial and buccal mold sections having tooth socket-completing seat portions arranged in opposition to the respective seat portions of the lingual mold section.

4. Apparatus for use in assembling and connecting teeth to exactly duplicate occlusally and otherwise the relative positioning of the teeth in an upper or lower master set and comprising a sectional assembly mold of hard material having tooth-receiving and embracing sockets formed by said master set, said sockets being adapted to receive individual unconnected teeth corresponding to those of the related master set, said mold comprising a base section having surface recesses corresponding to the occlusal or biting ends of the master set teeth, a raised portion on said base and providing lingual tooth-receiving recesses as continuations of the lingual sides of said base recesses, said recesses forming part of said tooth-receiving sockets and cooperating to sustain in position teeth as they are placed therein, separable labial and buccal mold sections having tooth socket-completing seat portions arranged in opposition to the respective seat portions of the lingual mold section, and a closure section compressible against the root ends of the teeth and the surfaces of the surrounding sections for securing a fastening element to the root ends of the teeth.

5. The combination set forth in claim 4, and clamp means for securing said sections in assembled relation.

6. The combination set forth in claim 4, and contiguous surfaces of said mold sections having interfitting position-defining means.

7. The combination set forth in claim 4, and contiguous surfaces of said mold sections having interfitting position-defining means, and clamp means for holding said mold sections in assembled relationship.

8. An assembly mold of hard material for the purpose specified comprising a base section, tooth socket portion-providing lingual, buccal and labial portions rising from said base, each of the buccal, labial and lingual sections having lateral projections, and the projections of the labial and buccal portions engaging projections of the lingual portion to separate adjacent tooth sockets at at least one point, said base providing tooth seats at the inner ends of said sockets, and at least certain of said buccal, labial and lingual portions being removably seated on said base.

9. The combination set forth in claim 8, and at least one of each pair of socket separating projections being cut away adjacent the root ends of adjacent sockets to accommodate a tooth connecting element.

10. The combination set forth in claim 8, and at least one of each pair of socket separating projections being cut away adjacent the root ends of adjacent sockets to accommodate a tooth connecting element, and a closure section for said mold compressible onto the labial, buccal and lingual sections for securing a fastening medium to adjacent teeth.

SIDNEY C. FOURNET.

REFERENCES CITED

The following references are of record in the file of this patent:

UNITED STATES PATENTS

| Number | Name | Date |
|---|---|---|
| 1,507,024 | Monson | Sept. 2, 1924 |
| 2,229,780 | Vaillancourt | Jan. 28, 1941 |

FOREIGN PATENTS

| Number | Country | Date |
|---|---|---|
| 828,164 | France | Feb. 7, 1938 |